United States Patent
Kong et al.

(10) Patent No.: US 10,126,596 B2
(45) Date of Patent: Nov. 13, 2018

(54) DISPLAY DEVICE

(71) Applicant: LG ELECTRONICS INC., Seoul (KR)

(72) Inventors: Junhee Kong, Seoul (KR); Hyungu Kim, Seoul (KR); Subin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/090,260

(22) Filed: Apr. 4, 2016

(65) Prior Publication Data

US 2016/0320668 A1 Nov. 3, 2016

(30) Foreign Application Priority Data

Apr. 29, 2015 (KR) .................. 10-2015-0060731

(51) Int. Cl.
*G02F 1/1335* (2006.01)
*G02F 1/1339* (2006.01)
*G02F 1/1333* (2006.01)

(52) U.S. Cl.
CPC ...... *G02F 1/133608* (2013.01); *G02F 1/1339* (2013.01); *G02F 1/133603* (2013.01); *G02F 1/133605* (2013.01); *G02F 1/133308* (2013.01); *G02F 2001/13398* (2013.01); *G02F 2001/133317* (2013.01)

(58) Field of Classification Search
None
See application file for complete search history.

(56) References Cited

U.S. PATENT DOCUMENTS

| 2007/0109767 | A1* | 5/2007 | Han | G02F 1/133604 362/97.2 |
|---|---|---|---|---|
| 2007/0242446 | A1 | 10/2007 | Lee | |
| 2008/0055917 | A1* | 3/2008 | Fukuda | F21V 19/0075 362/382 |
| 2009/0207335 | A1* | 8/2009 | Lee | G02F 1/133608 349/58 |
| 2010/0254118 | A1* | 10/2010 | Satoh | G02F 1/133604 362/97.1 |
| 2011/0103040 | A1 | 5/2011 | Teragawa | |
| 2011/0149598 | A1 | 6/2011 | Min | |

(Continued)

FOREIGN PATENT DOCUMENTS

KR   10-1432501 B1   8/2014

*Primary Examiner* — Edward Glick
*Assistant Examiner* — Anthony G Quash
(74) *Attorney, Agent, or Firm* — Birch, Stewart, Kolasch & Birch, LLP

(57) ABSTRACT

A display device is disclosed. The display device includes: a display panel; an optical layer configured to be positioned behind the display panel; a reflecting sheet configured to be positioned at the rear side of the optical layer; a frame configured to be positioned behind the reflecting sheet; and a supporter configured to be positioned between the optical layer and the reflecting sheet so that the optical layer and the reflecting sheet are spaced apart from each other and to have an elastic portion that at least partially deforms upon deformation of the optical layer. According to the present invention, even if the optical layer deforms, the possibility of damage to the optical layer due to the supporter with the elastic portion can be reduced.

18 Claims, 17 Drawing Sheets

(56) References Cited

U.S. PATENT DOCUMENTS

2012/0120324 A1\* 5/2012 Yoshikawa ....... G02F 1/133608
　　　　　　　　　　　　　　　　　　　348/739
2016/0274413 A1\* 9/2016 Kang ................ G02F 1/133608

\* cited by examiner

FIG. 11
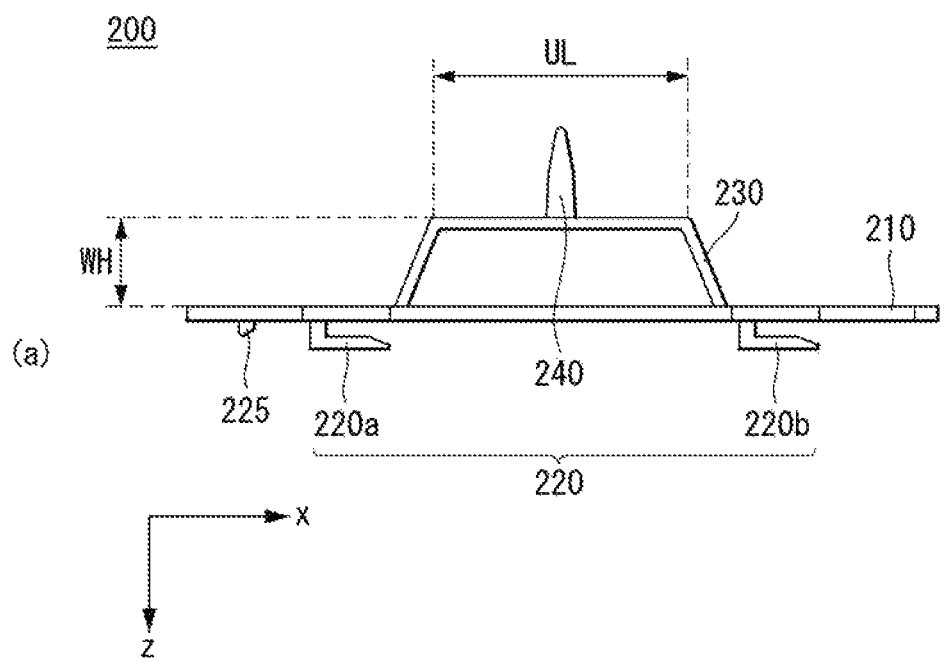
(a)
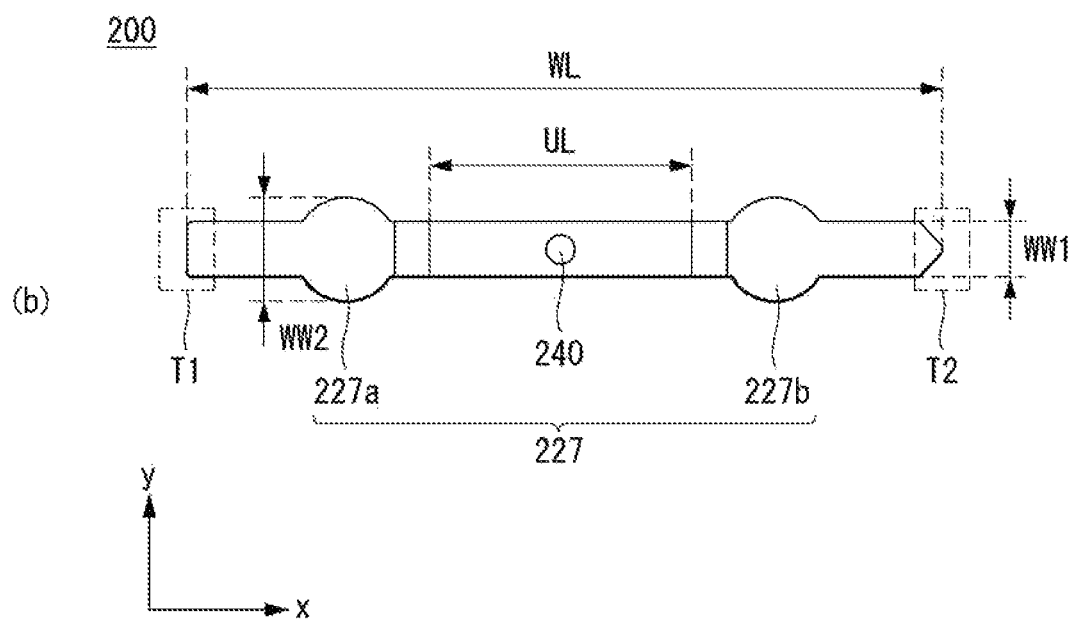
(b)

FIG. 15
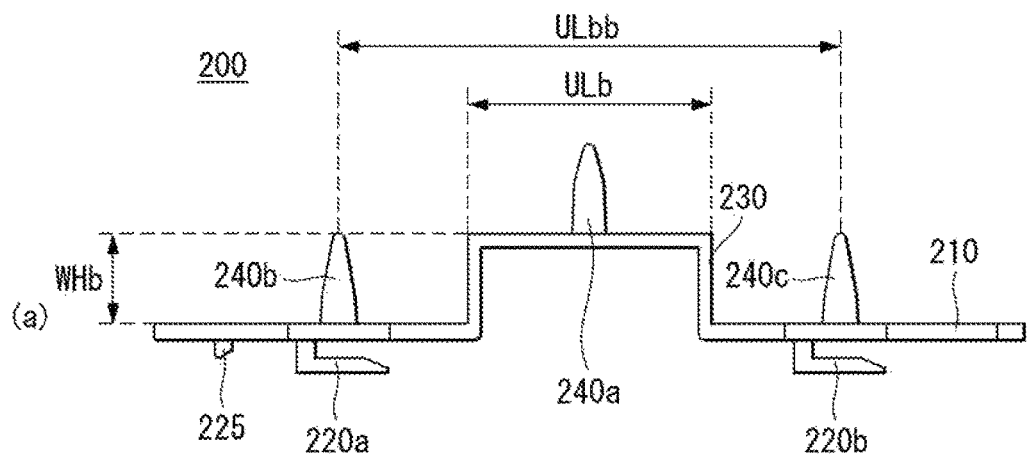
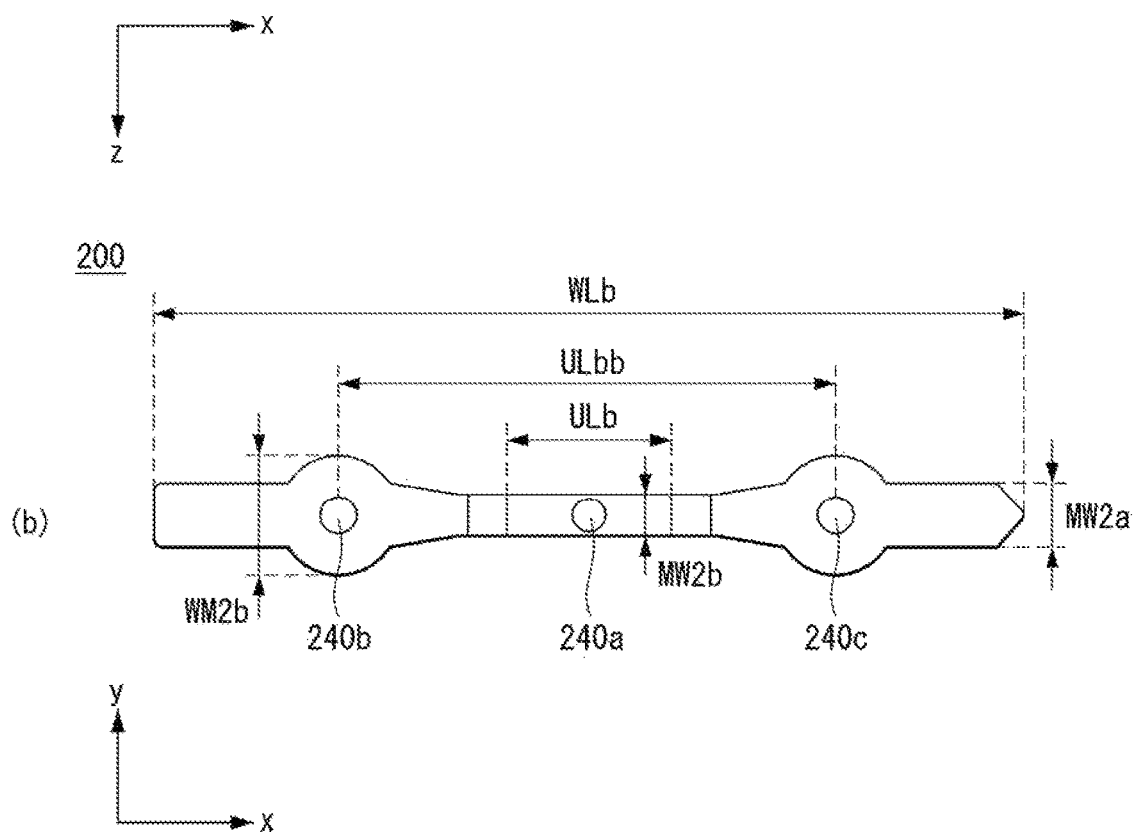

FIG. 16
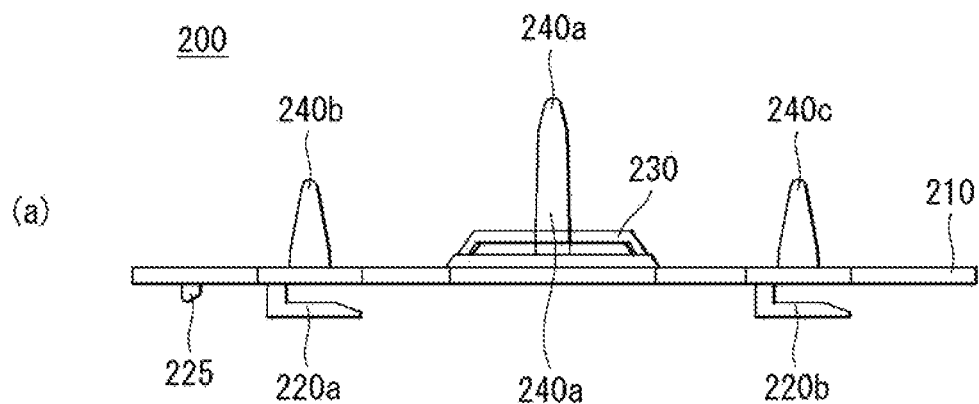
(a)
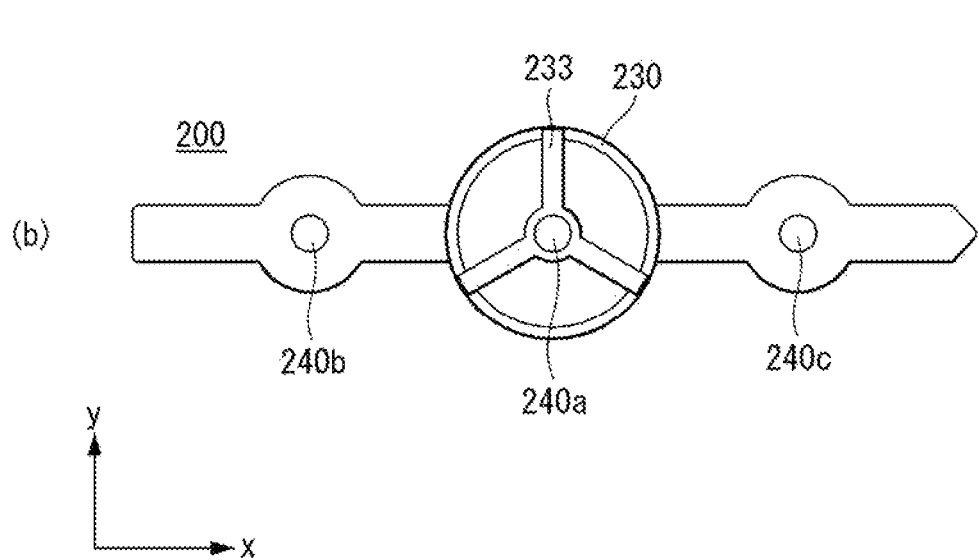
(b)

DISPLAY DEVICE

This application claims the benefit of Korean Patent Application No. 10-2015-0060731 filed on Apr. 29, 2015, the entire contents of which are incorporated herein by reference for all purposes as if fully set forth herein.

BACKGROUND OF THE INVENTION

Field of the Invention

The present disclosure relates to a display apparatus including the backlight unit.

Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

SUMMARY OF THE INVENTION

An aspect of the present invention is to provide a display device including: a display panel; an optical layer configured to be positioned behind the display panel; a reflecting sheet configured to be positioned at the rear side of the optical layer; a frame configured to be positioned behind the reflecting sheet; and a supporter configured to be positioned between the optical layer and the reflecting sheet so that the optical layer and the reflecting sheet are spaced apart from each other and to have an elastic portion that at least partially deforms upon deformation of the optical layer.

The supporter may further include at least one first supporting portion configured to be provided on the elastic portion and to extend in the direction of the optical layer so that the tip comes into contact with the optical layer.

The elastic portion may be configured to be in the shape of a trapezoid whose top, where the first supporting portion is positioned, is shorter in length than the bottom from which the elastic portion extends.

The diameter of the tip of the first supporting portion coming into contact with the optical layer may be smaller than the diameter of the base of the first supporting portion.

The elastic portion may be configured to be in the shape of a circle in a plane substantially perpendicular to the direction the first supporting portion extends.

The supporter may further include at least one coupling projection configured to be provided on the opposite side to the direction the elastic portion projects and to be coupled to a coupling hole in the reflecting sheet.

The at least one coupling projection may be configured to be in the shape of a hook with one side open.

The supporter may further include a base end portion from which the elastic portion extends out, wherein the base end portion may be configured to be formed with at least one second supporting portion extending in the direction of the optical layer.

The at least one second supporting portion may be configured to come into contact with the optical layer when the elastic portion in contact with the optical layer deforms.

The at least one second supporting portion may be configured to be positioned on at least one extension which is greater in width than the base end portion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 11 is a view illustrating a cross-section taken along I-I of FIG. 10;

FIGS. 14 to 18 are views illustrating supporters according to various example embodiments of the invention.

DETAILED DESCRIPTION OF THE EMBODIMENTS

Figure 1:
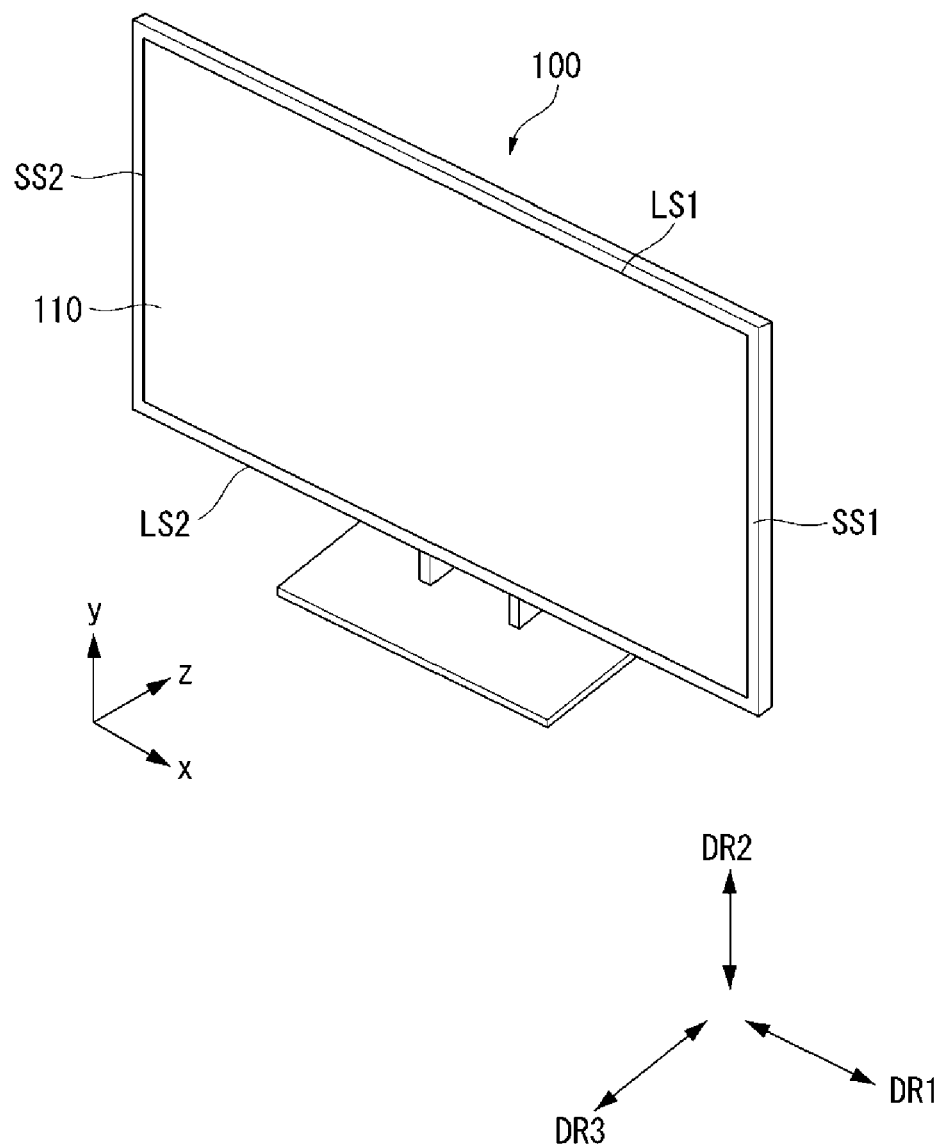
FIGS. 1 and 2 illustrate a display device according to an example embodiment of the invention.

Reference will now be made in detail to embodiments of the invention, examples of which are illustrated in the accompanying drawings. Wherever possible, the same reference numbers will be used throughout the drawings to refer to the same or like parts. A suffix such as "module" and "unit"" may be assigned or used interchangeably to refer to elements or components. Use of such a suffix herein is merely intended to facilitate the description of the embodiments of the invention, and the suffix itself is not intended to give any special meaning or function. It will be paid attention that detailed description of known arts will be omitted if it is determined that the detailed description of the know arts can obscure the embodiments of the invention. The accompanying drawings are merely intended to easily describe the embodiments of the invention, and the spirit and technical scope of the present invention is not limited by the accompanying drawings. It should be understood that the present invention is not limited to specific disclosed embodiments, but includes all modifications, equivalents and substitutes included within the spirit and technical scope of the present invention.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display panel may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display panel, and a second direction DR2 may be a direction parallel to the short sides SS1 and SS2 of the display panel.

Further, a third direction DR3 may be a direction vertical to the first direction DR1 and/or the second direction DR2.

In the embodiment disclosed herein, the first direction DR1 and the second direction DR2 may be commonly referred to as a horizontal direction.

Further, the third direction DR3 may be referred to as a vertical direction.

Figure 2:
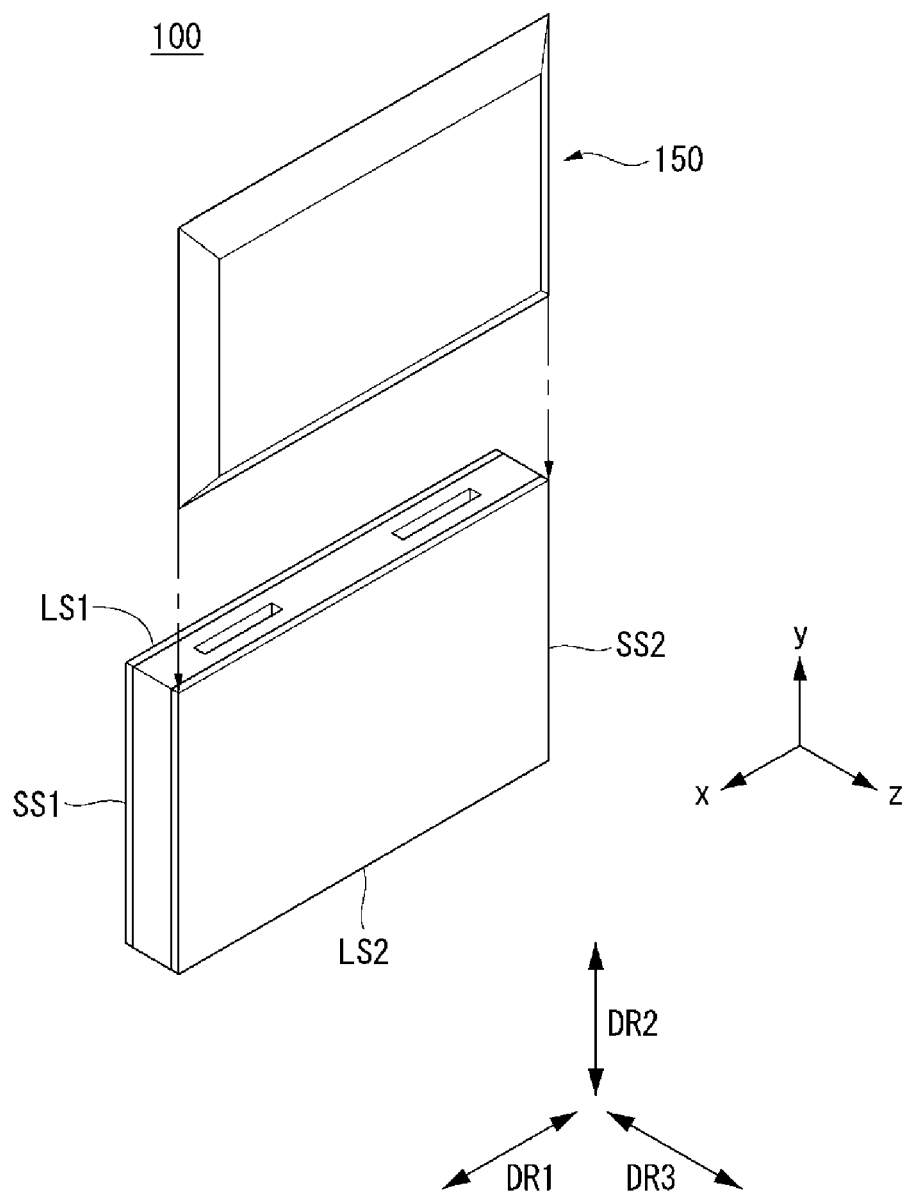

FIGS. 1 and 2 illustrate a display device according to an example embodiment of the invention.

As shown in FIGS. 1 and 2, a display device 100 according to the embodiment of the invention may include a display panel 110 and a back cover 150 positioned in the rear of the display panel 110.

The back cover 150 may be connected to the display panel 110 in a sliding manner in a direction (i.e., the second direction DR2) from the first long side LS1 to the second long side LS2. In other words, the back cover 150 may be inserted into the first short side SS1, the second short side SS2 opposite the first short side SS1, and the first long side LS1 which is adjacent to the first and second short sides SS1 and SS2 and is positioned between the first short side SS1 and the second short side SS2, of the display panel 110 in the sliding manner.

The back cover 150 and/or other components adjacent to the back cover 150 may include a protrusion, a sliding unit, a connection unit, etc., so that the back cover 150 is connected to the display panel 110 in the sliding manner.

FIGS. 3 to 7 illustrate configuration of a display device related to the embodiment of the invention.

Figure 3:
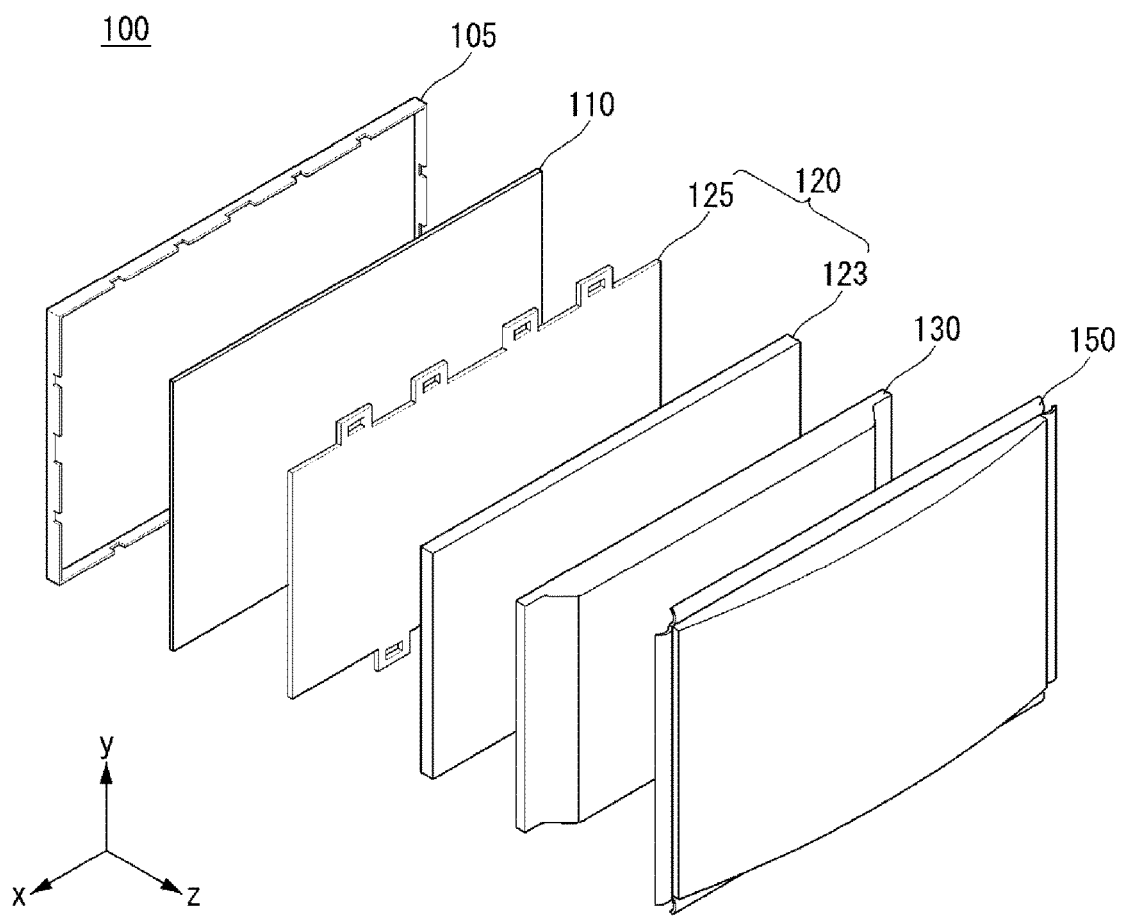
FIGS. 3 to 7 illustrate configuration of a display device related to an example embodiment of the invention.

As shown in FIG. 3, the display device 100 according to the embodiment of the invention may include a front cover 105, the display panel 110, a backlight unit 120, a frame 130, and the back cover 150.

The front cover 105 may cover at least a portion of a front surface and a side surface of the display panel 110. The front cover 105 may have a rectangular fame shape, in which a center portion is empty. Because the center portion of the front cover 105 is empty, an image displayed on the display panel 110 may be seen to the outside.

The front cover 105 may include a front cover and a side cover. Namely, the front cover 105 may include the front cover positioned at the front surface of the display panel 110 and the side cover at the side surface of the display panel 110. The front cover and the side cover may be separately configured. One of the front cover and the side cover may be omitted. For example, the front cover may be omitted, and only the side cover may be absent in terms of a beautiful appearance of the display device 100.

The display panel 110 may be positioned in front of the display device 100 and may display an image. The display panel 110 may divide the image into a plurality of pixels and may output the image while controlling color, brightness, and chroma of each pixel. The display panel 110 may include an active area, on which the image is displayed, and an inactive area, on which the image is not displayed. The display panel 110 may include a front substrate and a back substrate which are positioned opposite each other with a liquid crystal layer interposed therebetween.

The front substrate may include a plurality of pixels each including red, green, and blue subpixels. The front substrate may generate an image corresponding to the red, green, or blue color in response to a control signal.

The back substrate may include switching elements. The back substrate may turn on pixel electrodes. For example, the pixel electrode may change a molecule arrangement of the liquid crystal layer in response to a control signal received from the outside. The liquid crystal layer may include a plurality of liquid crystal molecules. The arrangement of the liquid crystal molecules may change depending on a voltage difference between the pixel electrode and a common electrode. The liquid crystal layer may transmit light provided by the backlight unit 120 to the front substrate.

The backlight unit 120 may be positioned at a back surface of the display panel 110. The backlight unit 120 may include a plurality of light sources. The light sources of the backlight unit 120 may be arranged in an edge type or a direct type. In the instance of the edge type backlight unit 120, a light guide plate may be added.

The backlight unit 120 may be coupled to a front surface of the frame 130. For example, the plurality of light sources may be disposed at the front surface of the frame 130. In this instance, the backlight unit 120 may be commonly called the direct type backlight unit 120.

The backlight unit 120 may be driven in an entire driving method or a partial driving method such as a local dimming method and an impulsive driving method. The backlight unit 120 may include an optical sheet 125 and an optical layer 123.

The optical sheet 125 can cause light of the light sources to be uniformly transferred to the display panel 110. The optical sheet 125 may include a plurality of layers. For example, the optical sheet 125 may include at least one prism sheet and/or at least one diffusion sheet.

The optical sheet 125 may further include at least one coupling unit 125d. The coupling unit 125d may be coupled to the front cover 105 and/or the back cover 150. Namely, the coupling unit 125d may be directly coupled to the front cover 105 and/or the back cover 150. Alternatively, the coupling unit 125d may be coupled to a structure formed on the front cover 105 and/or the back cover 150. Namely, the coupling unit 125d may be indirectly coupled to the front cover 105 and/or the back cover 150.

The optical layer 123 may include the light source, etc. The detailed configuration of the optical layer 123 will be described in the corresponding paragraphs.

The frame 130 may support components constituting the display device 100. For example, the frame 130 may be coupled to the backlight unit 120. The frame 130 may be formed of a metal material, for example, an aluminum alloy.

The back cover 150 may be positioned at a back surface of the display device 100. The back cover 150 may protect inner configuration of the display device 100 from the outside. At least a portion of the back cover 150 may be coupled to the frame 130 and/or the front cover 105. The back cover 150 may be an injection production (or injection molded) formed of a resin material.

Figure 4:
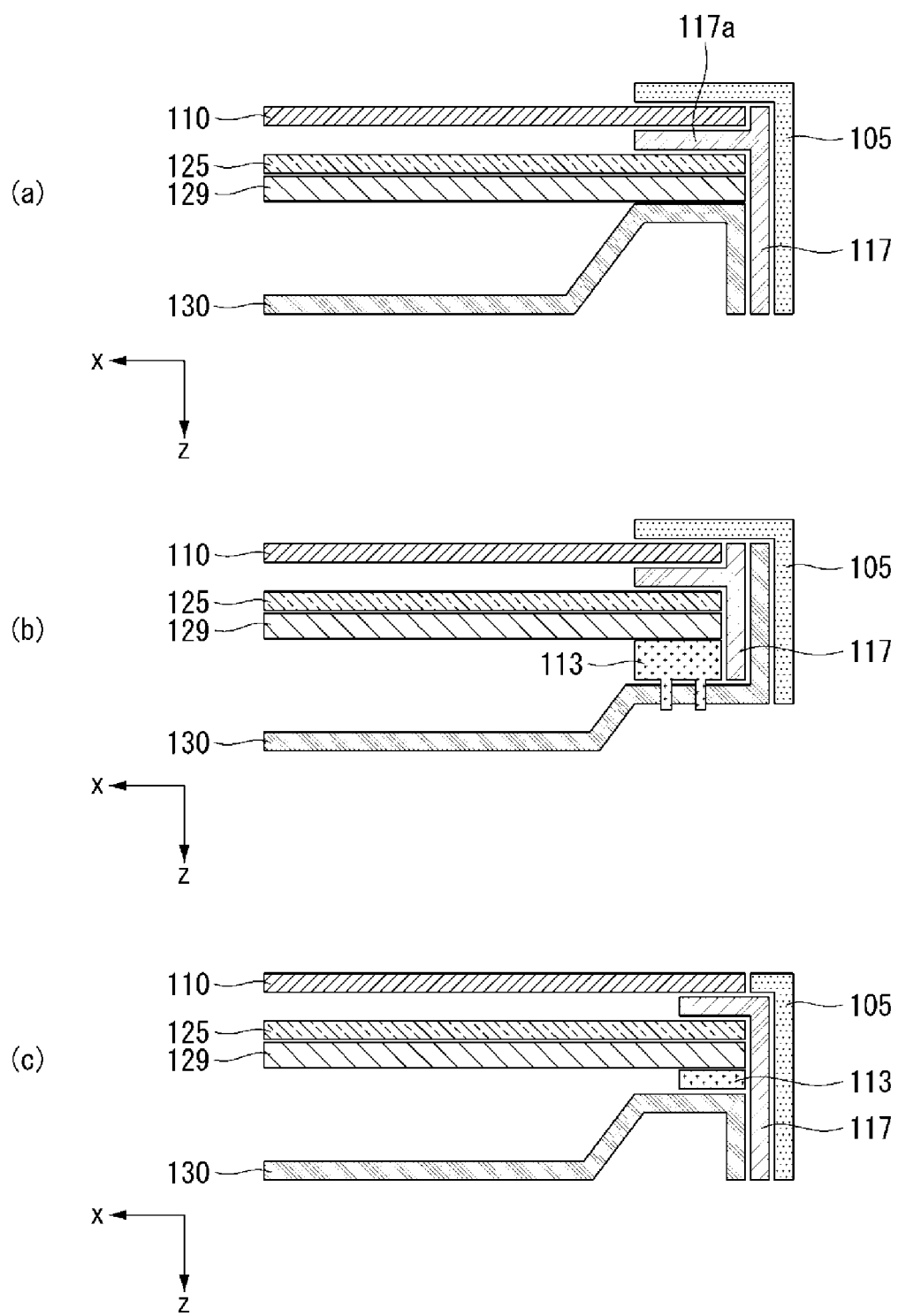

FIG. 4 shows the configuration of the optical sheet 125.

As shown in (a) of FIG. 4, the optical sheet 125 and/or a diffusion plate 129 may be positioned on the frame 130. The optical sheet 125 and/or the diffusion plate 129 may be coupled to the frame 130 at an edge of the frame 130. The optical sheet 125 and/or the diffusion plate 129 may be directly placed at the edge of the frame 130. Namely, an outer perimeter of the optical sheet 125 and/or the diffusion plate 129 may be supported by the frame 130. An upper surface of an edge of the optical sheet 125 and/or the diffusion plate 129 may be surrounded by a first guide panel 117. For example, the optical sheet 125 and/or the diffusion plate 129 may be positioned between the edge of the frame 130 and a flange 117a of the first guide panel 117.

The display panel 110 may be positioned at a front surface of the optical sheet 125. An edge of the display panel 110 may be coupled to the first guide panel 117. Namely, the display panel 110 may be supported by the first guide panel 117.

An edge area of the front surface of the display panel 110 may be surrounded by the front cover 105. For example, the display panel 110 may be positioned between the first guide panel 117 and the front cover 105.

As shown in (b) of FIG. 4, the display device 100 according to the embodiment of the invention may further include a second guide panel 113. The optical sheet 125 and/or the diffusion plate 129 may be coupled to the second guide panel 113. Namely, the second guide panel 113 may have a shape, in which the second guide panel 113 is coupled to the frame 130 and the optical sheet 125 and/or the diffusion plate 129 are/is coupled to the second guide panel 113. The second guide panel 113 may be formed of a material different from the frame 130. The frame 130 may have a shape surrounding the first and second guide panels 117 and 113.

As shown in (c) of FIG. 4, in the display device 100 according to the embodiment of the invention, the front cover 105 may not cover the front surface of the display panel 110. Namely, one end of the front cover 105 may be positioned on the side of the display panel 110.

Figure 5:
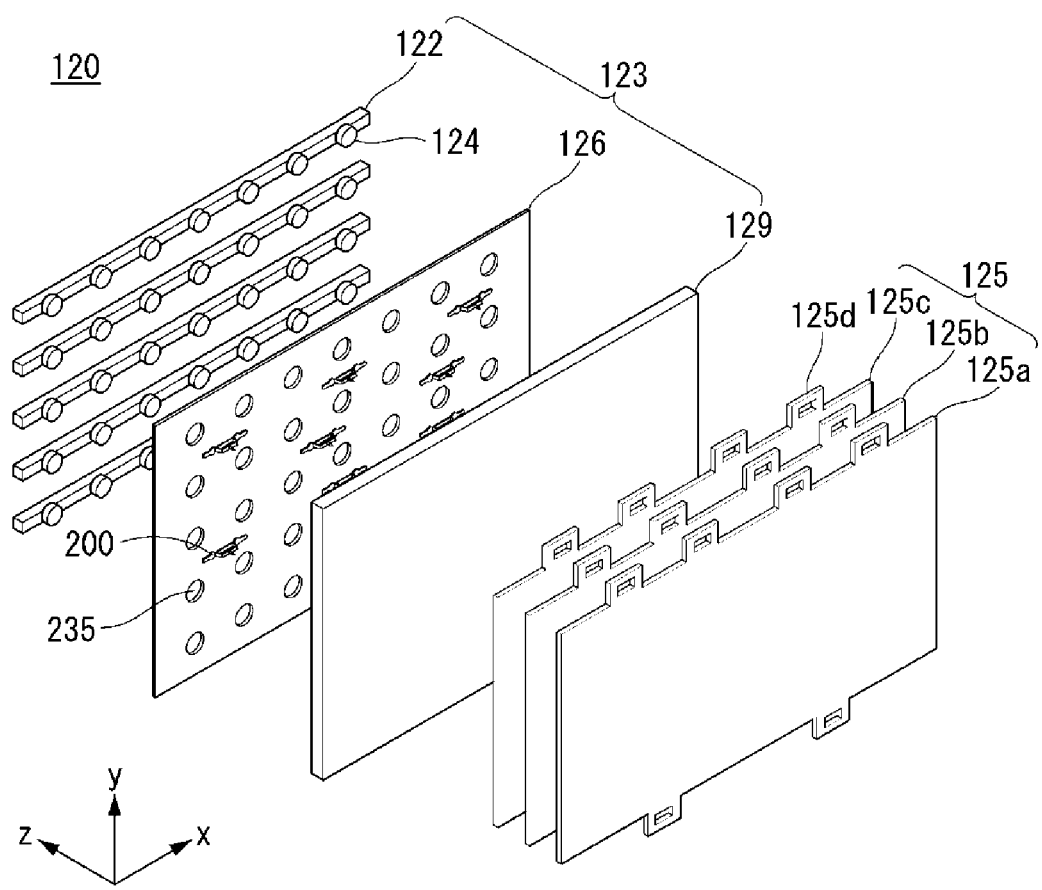
Figure 6:
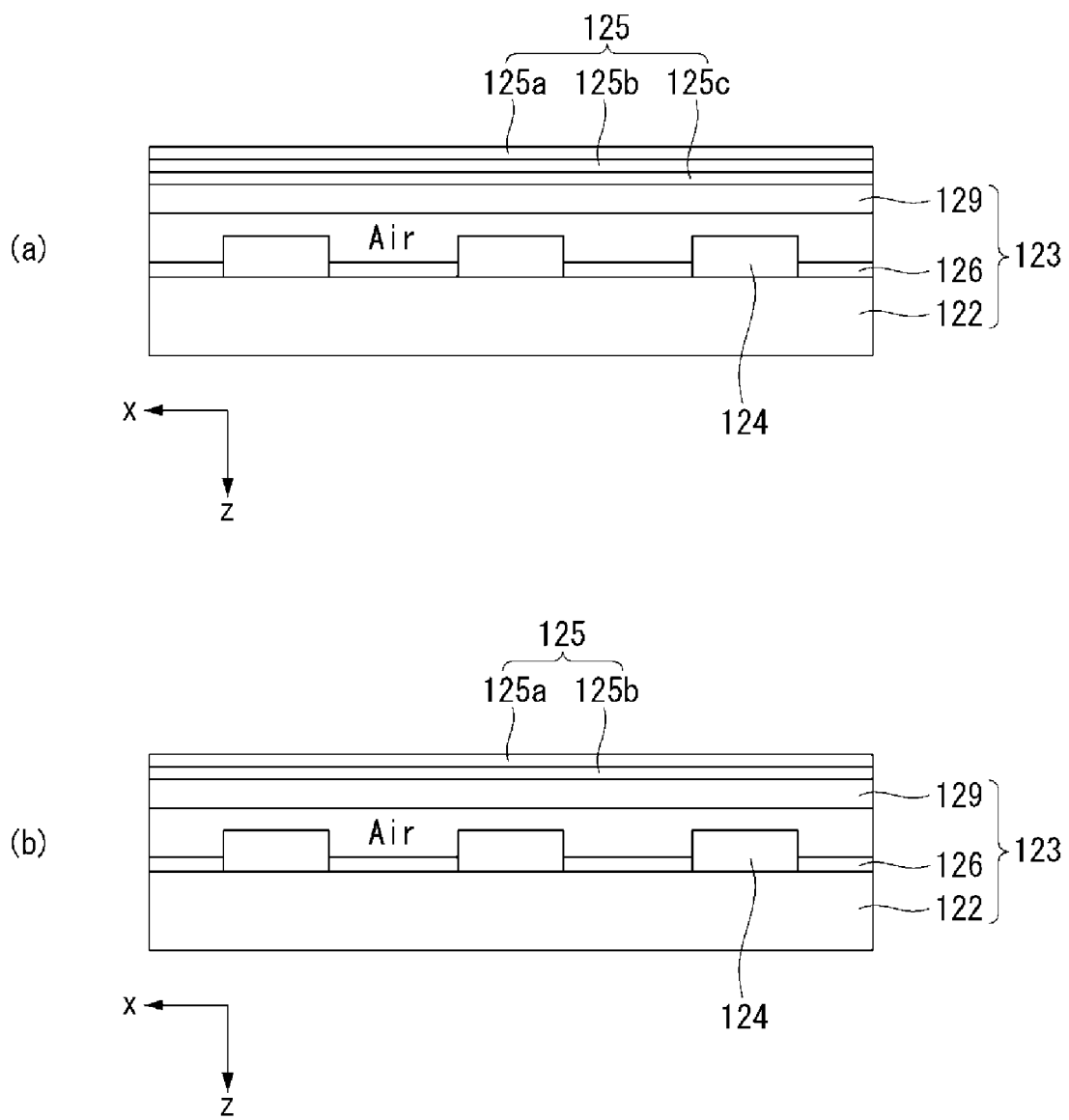

Referring to FIGS. 5 and 6, the backlight unit 120 may include the optical layer 123 including substrates 122, at least one light assembly 124, a reflecting sheet 126 and the diffusion plate 129, and the optical sheet 125 positioned on a front surface of the optical layer 123.

The substrates 122 may include a plurality of straps, which extend in a first direction and are separated from one another by a predetermined distance in a second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 maybe formed of at least one of polyethyleneterephthalate (PET), glass, polycarbonate (PC), and silicon. The substrate 122 maybe a printed circuit board (PCB), on which at least one light assembly 124 is mounted.

The light assemblies 124 may be disposed on the substrate 122 at predetermined intervals in the first direction. A diameter of the light assembly 124 may be greater than a width of the substrate 122. Namely, the diameter of the light assembly 124 may be greater than a length of the substrate 122 in the second direction.

The light assembly 124 may be one of a light emitting diode (LED) chip and a LED package having at least one LED chip.

The light assembly 124 may be configured as a colored LED emitting at least one of red, green, and blue light or a white LED. The colored LED may include at least one of a red LED, a green LED, and a blue LED.

The light source included in the light assembly 124 may be a COB (Chip-On-Board) type. The COB light source may have a configuration, in which the LED chip as the light source is directly coupled to the substrate 122. Thus, the process may be simplified. Further, a resistance may be reduced, and a loss of energy resulting from heat may be reduced. Namely, power efficiency of the light assembly 124 may increase. The COB light source can provide the brighter lighting and may be implemented to be thinner and lighter than a related art.

The reflecting sheet 126 may be positioned at the front surface of the substrate 122. The reflecting sheet 126 may be positioned in an area excluding a formation area of the light assemblies 124 of the substrates 122. Namely, the reflecting sheet 126 may have a plurality of holes 235.

The reflecting sheet 126 may reflect light emitted from the light assembly 124 to a front surface of the reflecting sheet 126. Further, the reflecting sheet 126 may again reflect light reflected from the diffusion plate 129.

The reflecting sheet 126 may include at least one of metal and metal oxide which are a reflection material. The reflecting sheet 126 may include metal and/or metal oxide having a high reflectance, for example, aluminum (Al), silver (Ag), gold (Au), and titanium dioxide (TiO2).

The reflecting sheet 126 may be formed by depositing and/or coating the metal or the metal oxide on the substrate 122. An ink including the metal material may be printed on the reflecting sheet 126. On the reflecting sheet 126, a deposition layer may be formed using a heat deposition method, an evaporation method, or a vacuum deposition method such as a sputtering method. On the reflecting sheet 126, a coating layer and/or a printing layer may be formed using a printing method, a gravure coating method or a silk screen method.

An air gap may be positioned between the reflecting sheet 126 and the diffusion plate 129. The air gap may serve as a buffer capable of widely spreading light emitted from the light assembly 124. A supporter (or support plate) 200 may be positioned between the reflecting sheet 126 and the diffusion plate 129, so as to maintain the air gap.

A resin may be deposited on the light assembly 124 and/or the reflecting sheet 126. The resin may function to diffuse light emitted from the light assembly 124.

The diffusion plate 129 may upwardly diffuse light emitted from the light assembly 124.

The optical sheet 125 may be positioned at a front surface of the diffusion plate 129. A back surface of the optical sheet 125 may be adhered to the diffusion plate 129, and a front surface of the optical sheet 125 may be adhered to the back surface of the display panel 110.

The optical sheet 125 may include at least one sheet. More specifically, the optical sheet 125 may include one or more prism sheets and/or one or more diffusion sheets. The plurality of sheets included in the optical sheet 125 may be attached and/or adhered to one another.

In other words, the optical sheet 125 may include a plurality of sheets having different functions. For example, the optical sheet 125 may include first to third optical sheets 125a to 125c. The first optical sheets 125a may function as a diffusion sheet, and the second and third optical sheets 125b and 125c may function as a prism sheet. A number and/or a position of the diffusion sheets and the prism sheets may be changed. For example, the optical sheet 125 may include the first optical sheets 125a as the diffusion sheet and the second optical sheet 125b as the prism sheet.

The diffusion sheet may prevent light coming from the diffusion plate from being partially concentrated and may homogenize a luminance of the light. The prism sheet may concentrate light coming from the diffusion sheet and may make the concentrated light be vertically incident on the display panel 110.

The coupling unit 125d may be formed on at least one of corners of the optical sheet 125. The coupling unit 125d may be formed in at least one of the first to third optical sheets 125a to 125c.

The coupling unit 125d may be formed at the corner on the long side of the optical sheet 125. The coupling unit 125d formed on the first long side and the coupling unit 125d formed on the second long side may be asymmetric. For example, a number and/or a position of the coupling units 125d formed on the first long side may be different from a number and/or a position of the coupling units 125d formed on the second long side.

Figure 7:
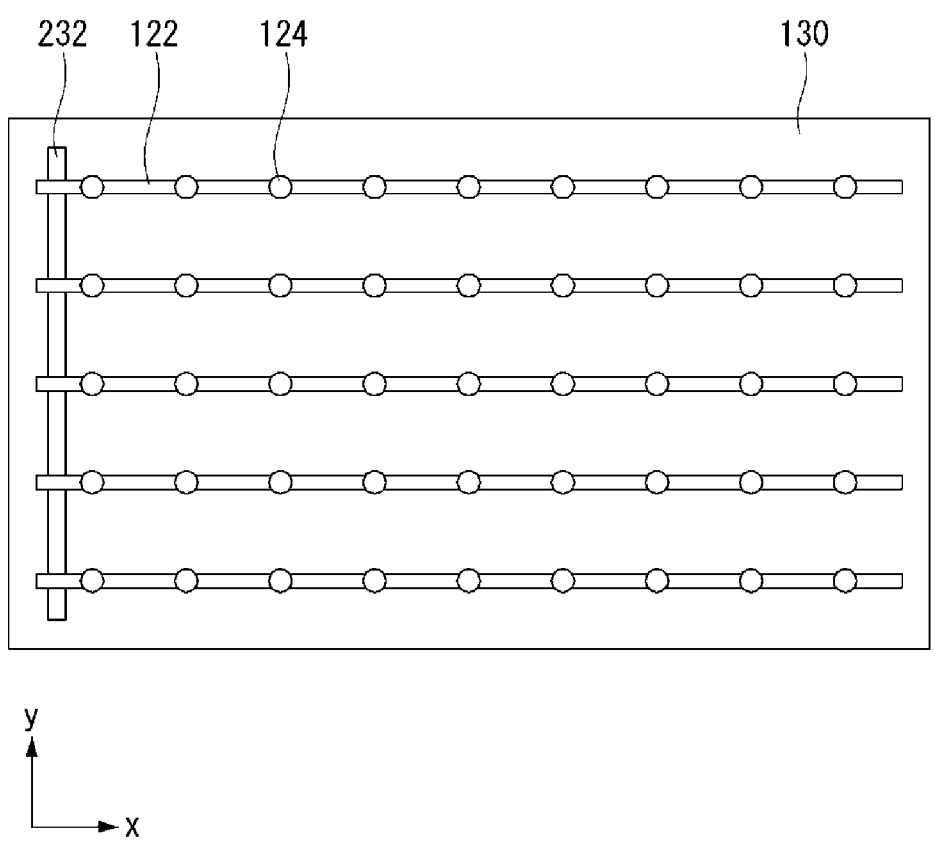

Referring to FIG. 7, the substrates 122 including the plurality of straps, which extend in the first direction and are separated from one another by a predetermined distance in the second direction perpendicular to the first direction, may be provided on the frame 130. One end of each of the plurality of substrates 122 may be connected to a line electrode 232.

The line electrode 232 may extend in the second direction. The line electrode 232 may be connected to the ends of the substrates 122 at predetermined intervals in the second direction. The substrates 122 may be electrically connected to the adaptor through the line electrode 232.

The light assemblies 124 may be mounted on the substrate 122 at predetermined intervals in the first direction. A diameter of the light assembly 124 may be greater than a width of the substrate 122 in the second direction. Hence, an outer area of the light assembly 124 may be positioned beyond a formation area of the substrate 122.

Figure 8:
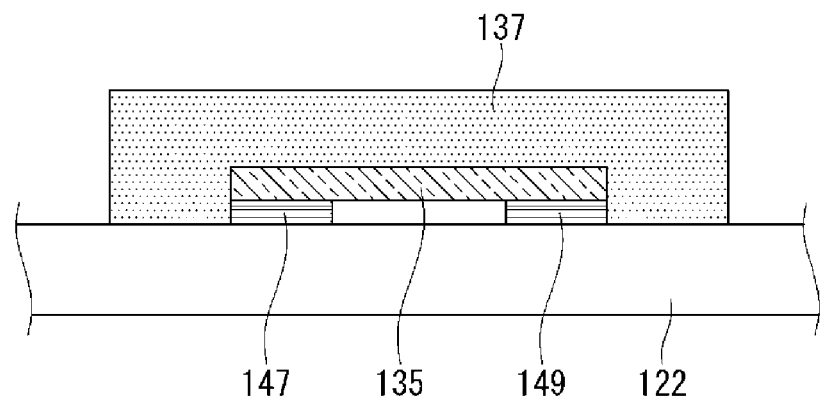
FIGS. 8 and 9 illustrate a light source according to an example embodiment of the invention.
Figure 9:
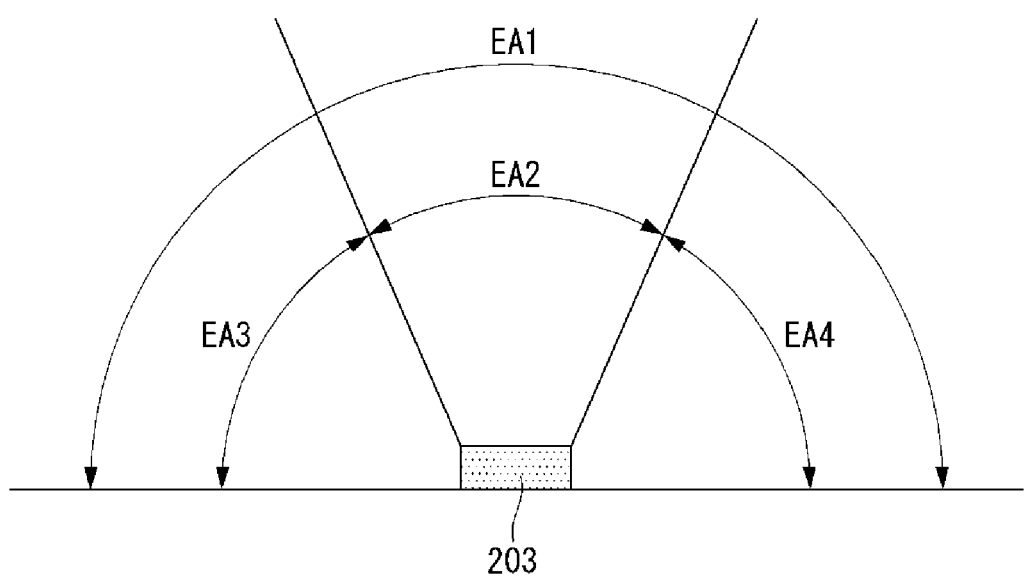

FIGS. 8 and 9 show a light source according to the embodiment of the invention.

As shown in FIG. 8, a light source 203 may be a COB light source. The COB light source 203 may include at least one of an emission layer 135, first and second electrodes 147 and 149, and a fluorescent layer 137.

The emission layer 135 may be positioned on the substrate 122. The emission layer 135 may emit one of red, green, and blue light. The emission layer 135 may include one of Firpic, (CF3ppy)2Ir(pic), 9,10-di(2-naphthyl)anthracene(AND), perylene, distyrybiphenyl, PVK, OXD-7, UGH-3(Blue), and a combination thereof.

The first and second electrodes 147 and 149 may be positioned on both sides of a lower surface of the emission layer 135. The first and second electrodes 147 and 149 may transmit an external driving signal to the emission layer 135.

The fluorescent layer 137 may cover the emission layer 135 and the first and second electrodes 147 and 149. The fluorescent layer 137 may include a fluorescent material converting light of a spectrum generated from the emission layer 135 into white light. A thickness of the emission layer 135 on the fluorescent layer 137 may be uniform. The fluorescent layer 137 may have a refractive index of 1.4 to 2.0.

The COB light source 203 according to the embodiment of the invention may be directly mounted on the substrate 122. Thus, the size of the light assembly 124 may decrease.

Because heat dissipation of the light sources 203 is excellent by forming the light sources 203 on the substrate 122, the light sources 203 may be driven at a high current. Hence, a number of light sources 203 required to secure the same light quantity may decrease.

Further, because the light sources 203 are mounted on the substrate 122, a wire bonding process may not be necessary. Hence, the manufacturing cost may be reduced due to the simplification of the manufacturing process.

As shown in FIG. 9, the light source 203 according to the embodiment of the invention may emit light in a first emission range EA1. Namely, the light source 203 may emit light in the first emission range EA1 including a second emission range EA2 of the front side and third and fourth emission ranges EA3 and EA4 of both sides. Thus, the light source 203 according to the embodiment of the invention is different from a related art POB light source emitting light in the second emission range EA2. In other words, the light source 203 according to the embodiment of the invention may be the COB light source, and the COB light source 203 may emit light in a wide emission range including the side.

Because the COB light source 203 emits light even in a direction corresponding to the third and fourth emission ranges EA3 and EA4 of the side, the embodiment of the invention needs to efficiently control light of the side direction. The reflecting sheet according to the embodiment of the invention may control a reflectance of light emitted from the light source 203 in the side direction. Thus, the embodiment of the invention may reduce the non-uniformity of brightness resulting from light of the side direction.

Figure 10:
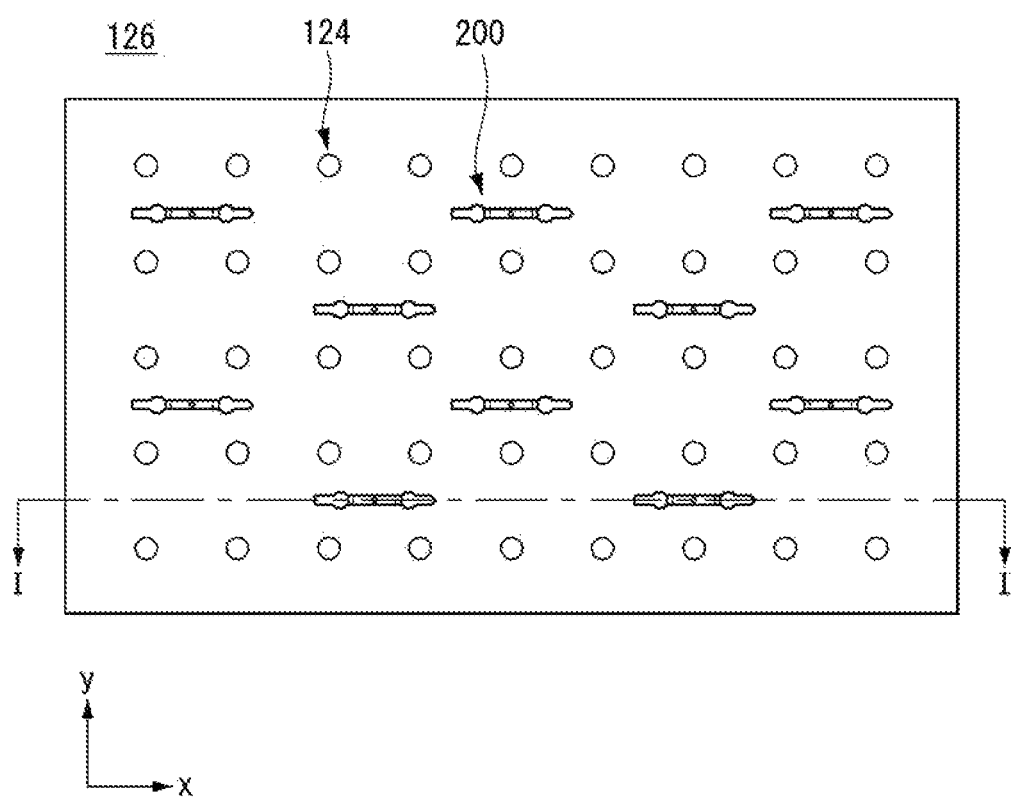
FIG. 10 illustrates the front of a reflecting sheet according to an example embodiment of the invention.

FIG. 10 illustrates the front of a reflecting sheet according to an example embodiment of the invention.

As illustrated therein, light assemblies 124 and supporters 200 may be disposed on a reflecting sheet 126 according to an example embodiment of the invention. For example, light assemblies 124 may be disposed horizontally and/or vertically, and supporters 200 may be disposed at regular intervals between the light assemblies 124. The number of supporters 200 may be smaller than the number of light assemblies 124.

The supporters 200 may be disposed in various patterns. For example, the number of supporters 200 in a particular row may be different from that in the next row. The number of supporters 200 disposed in a particular column may be equal to that in the next column.

The supporters 200 may be composed of soft materials such as rubber, silicon, etc. At least part of the supporters 200 may be composed of plastic material. For example, the supporters 200 may be molded with plastic material and then coated with soft material such as rubber.

The supporters 200 may keep a certain distance from the diffusion plate 129 positioned at the front of the reflecting sheet 126. That is, the diffusion plate 129 positioned at the front side of the optical layer 123 may be supported by the supporters 200.

FIG. 11 is a view illustrating a cross-section taken along I-I of FIG. 10.

As illustrated therein, coupling holes 245 may be formed in the reflecting sheet 126. The coupling holes 245 may connect to the substrate 200 positioned on the back of the reflecting sheet 126.

Coupling projections 220 may be provided on the bottom of the supporters 200. The coupling projections 220 may be positioned on the left and right of the center of the supporters 200. For example, first and second coupling projections 220a and 220b may be formed on the left and right of the center of each supporter 200. The first and second coupling projections 220a and 220b may be coupled to first and second coupling holes 245a 245b, respectively. The first and second coupling projections 220a and 220b may be coupled to both the reflecting sheet 126 and the substrate 122. Depending on the position of the supporters 200, the first and second coupling projections 220a and 220b may be coupled only to the reflecting sheet 126.

Figure 12:
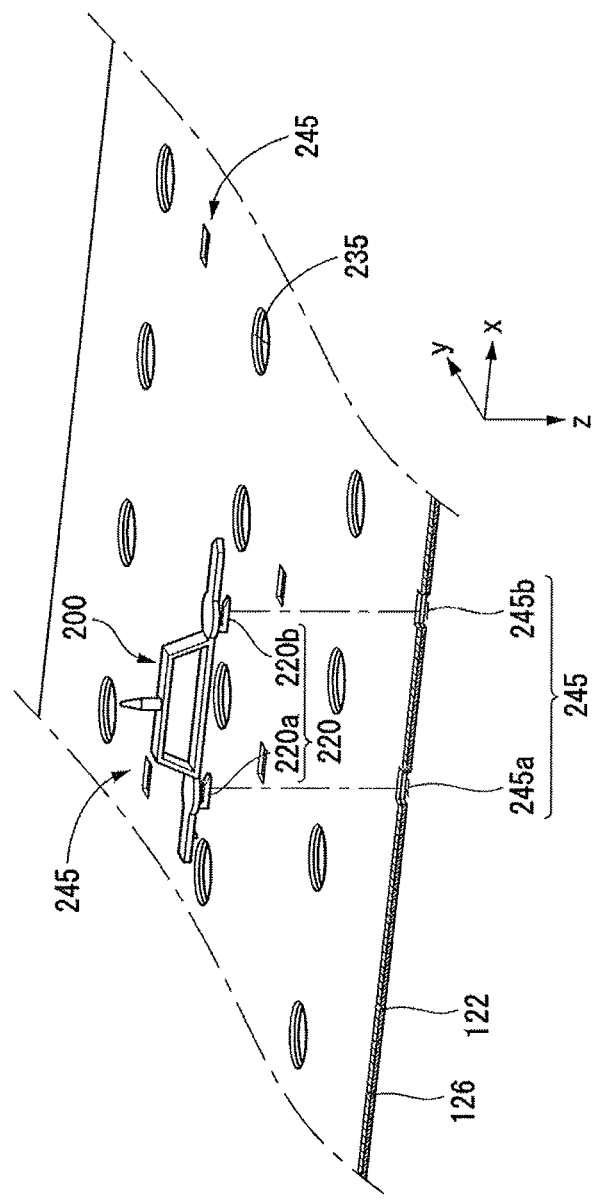
FIG. 12 is a view illustrating a supporter of FIG. 10.

FIG. 12 is a view illustrating a supporter of FIG. 10.

As illustrated therein, a supporter 200 according to an example embodiment of the invention may include a supporting portion 240, an elastic portion 230, a based end portion 210, and coupling projections 220.

The supporting portion 240 may project upward. For example, the supporting portion 240 may be a projection that extends upward to a certain length. The supporting portion 240 may gradually taper toward the tip. The tip of the supporting portion 240 may come in slight contact with the diffusion plate 129 and support the diffusion plate 129. Accordingly, the distance between the diffusion plate 129 and the light assemblies 124 and/or reflecting sheet 126 may be kept constant.

The elastic portion 230 may be a part between the supporting portion 240 and the base end portion 210. The elastic portion 230 may be a part that can deform when an external force acts on the supporter 200. For example, when an external force acts on the diffusion plate 129 during storage and transport of the product, the diffusion plate 129 may deform toward the supporting portion 240. If the diffusion plate 129 deforms toward the supporting portion 240, the elastic portion 230 may deform into a deformed shape of the diffusion plate 129. That is, the elastic portion 230 may absorb the amount of deformation of the diffusion plate 129. Without the elastic portion 230, the diffusion plate 129 may be damaged due to contact with the supporting portion 240. With the elastic portion 230, the supporter 200 according to the example embodiment of the invention may minimize damage to the diffusion plate 290.

The elastic portion 230 may have a first width UL at the top. The length of the first width UL at the top may affect the amount of deformation of the elastic portion 230. For instance, the amount of deformation of the elastic portion 230 may vary depending on at least one of the following: the ratio of the whole length WL of the supporter 200 and the first width UL; and the absolute length of the first width UL.

The elastic portion 230 may have a first height WH. The first height WH may affect the amount of deformation of the elastic portion 230. For instance, the amount of deformation of the elastic portion 230 may vary depending on at least one of the following: the ratio of the first width UL and the first height WH; and the absolute length of the first height WH.

The elastic portion 230 may have a trapezoidal shape. For example, the elastic portion 230 may have a first width UL at the top, a first height WH, and be longer than the first width UL at the bottom. The trapezoid-like elastic portion 230 may deform easily when an external force is applied to the supporting portion 240 at the top. This can prevent damage to the diffusion plate 129 in contact with the supporter 200.

The base end portion 210 may be a bottom part of the elastic portion 230. One part of the base end portion 210 may have a first width WW1. An extension 227 of the base end portion 210 may have a second width WW2. The second width WW2 may be greater than the first width WW1. For instance, the extension 227 may be a part from which the elastic portion 230 extends. Accordingly, even if the elastic portion 230 deforms, the supporter 200 may be in stable contact with the reflecting sheet 126.

One end T1 and the other end T2 of the base end portion 210 may have different shapes. The difference in shape between one end T1 and the other end T2 makes it easy to find the direction where to fit the supporter 200.

The coupling projections 220 may be formed on the bottom of the base end portion 210. That is, the elastic portion 230 may be provided on the top of the base end portion 210, and the coupling projections 220 may be provided on the bottom of the base end portion 210.

The coupling projections 220 may include first and second coupling projections 220a and 220b. The first and second coupling projections 220a and 220b may be in the shape of a hook with one side open. The first and second coupling projections 220a and 220b may be open in the same direction. Accordingly, the supporter 200 may be smoothly fit into the reflecting sheet 126 by moving it down the Z-axis and then along the X-axis.

A third coupling projection 225 may be additionally provided near the first coupling projection 220a. A coupling hole corresponding to the third coupling projection 225 may be additionally provided in the reflecting sheet 126. The third coupling projection 225 allows the supporter 200 to be fixed more firmly to the reflecting sheet 126.

Figure 13:
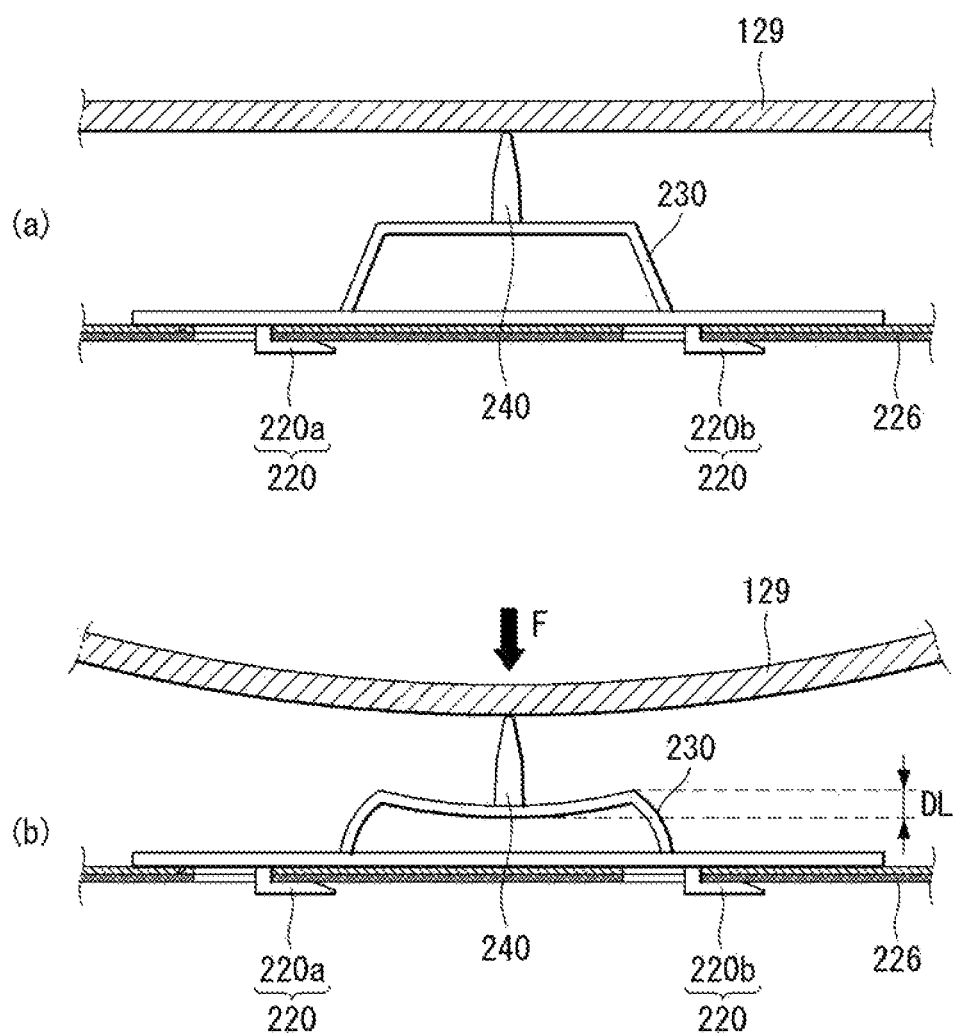
FIG. 13 is a view illustrating the operation of the supporter of FIG. 12.

FIG. 13 is a view illustrating the operation of the supporter of FIG. 12.

As illustrated therein, the supporter 200 according to the example embodiment of the present invention may support the diffusion plate 129 to keep it from getting damaged.

As illustrated in (a) of FIG. 13, the supporting portion 240 of the supporter 200 may come in contact with the diffusion plate 129. With the supporting portion 240 in contact with the diffusion plate 129, the distance between the reflecting sheet 126 and the diffusion plate 129 may be kept constant.

As illustrated in (b) of FIG. 13, an external force F may be applied to the diffusion plate 129 during storage and transport of the display device 100. For instance, an external force F may be applied in the thickness direction of the display device 100.

When an external force F is applied, the diffusion plate 129 may deform in the direction of the external force F. If the diffusion plate 129 deforms, the supporter 200 may deform as well. That is, the elastic portion 230 of the supporter 200 may deform by DL. As the elastic portion 230 deforms into a deformed shape of the diffusion plate 129, damage to the diffusion plate 128 due to the supporter 200 may be minimized. This will be more clearly understood when considering that a rigid supporter can damage the diffusion plate 129.

FIGS. 14 to 18 are views illustrating supporters according to various example embodiments of the invention.

As illustrated therein, this invention may apply to various types of supporters 200. That is, a supporter 200 having an elastic portion 230 that deforms into a deformed shape of the diffusion plate 129 may be used.

Figure 14:
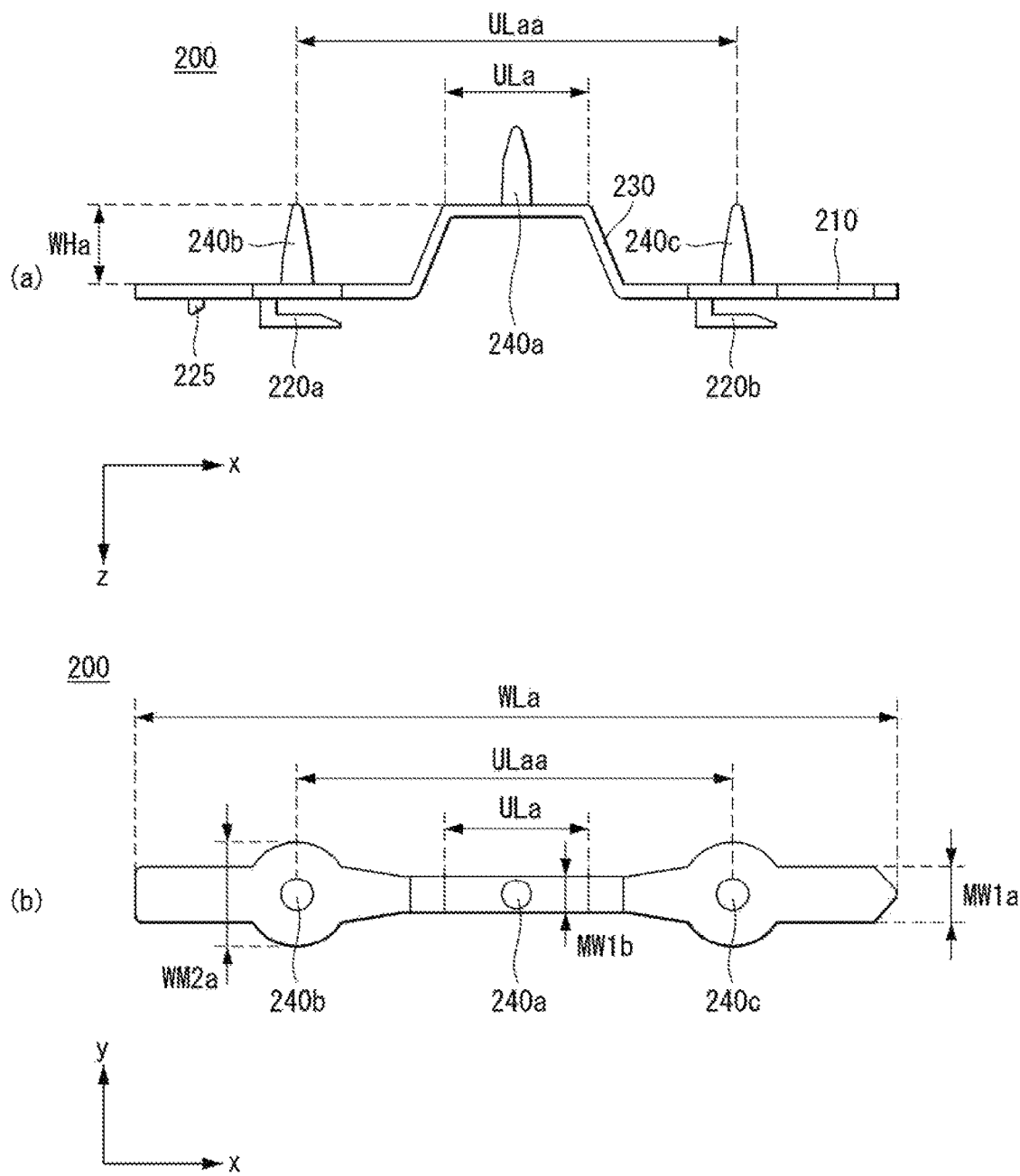

As illustrated in FIG. 14, a supporter 200 may be provided with an elastic portion 230. The top of the elastic portion 230 may have a second width ULa. The second width ULa may be smaller than the first width (UL of FIG. 12). With the second width ULa being smaller than the first width (UL of FIG. 12), the amount of deformation of the elastic portion 230 may be reduced.

The supporter 200 may be provided with first to third supporting portions 240a, 240b, and 240c. For instance, the first supporting portion 240a may be provided on the elastic portion 230, and the second and third supporting portions 240b and 240c may be provided on the base end portion 210. The second and third supporting portions 240b and 240c may be spaced apart from each other by a third width ULasa. That is, the second and third supporting portions 240b and 240c may be positioned symmetrically on either side of the center of the first supporting portion 240a.

The first to third supporting portions 240a, 240b, and 240c may sequentially come into contact with the diffusion plate 129. For instance, if the elastic portion 230 deforms to a certain degree while the first supporting portion 240a is in contact with the diffusion plate 129, the second and third supporting portions 240b and 240c may come into contact with the diffusion plate 129. As one supporter 200 comes into contact with three points on the diffusion plate 129, force can be distributed. This can prevent damage to the diffusion plate 129 due to concentration of excessive external force on particular points on the diffusion plate 129.

As illustrated in FIG. 15, the elastic portion 230 may have a rectangular shape. For instance, a rectangular or square elastic portion 230 may be provided. The shape of the elastic portion 230 may affect the amount of deformation of the elastic portion 230 caused by external force.

As illustrated in FIG. 16, the elastic portion 230 may be in the shape of a circle. For instance, a plurality of connecting portions 233 may be positioned between the supporting portion 240 and a circular base. For example, if there are three connecting portions 233, they may be arranged at equal 120 degree intervals. The elastic force of the elastic portion 230 may vary depending on the size of the circular base forming the elastic portion 230 and/or the number of connecting portions 233.

Figure 17:
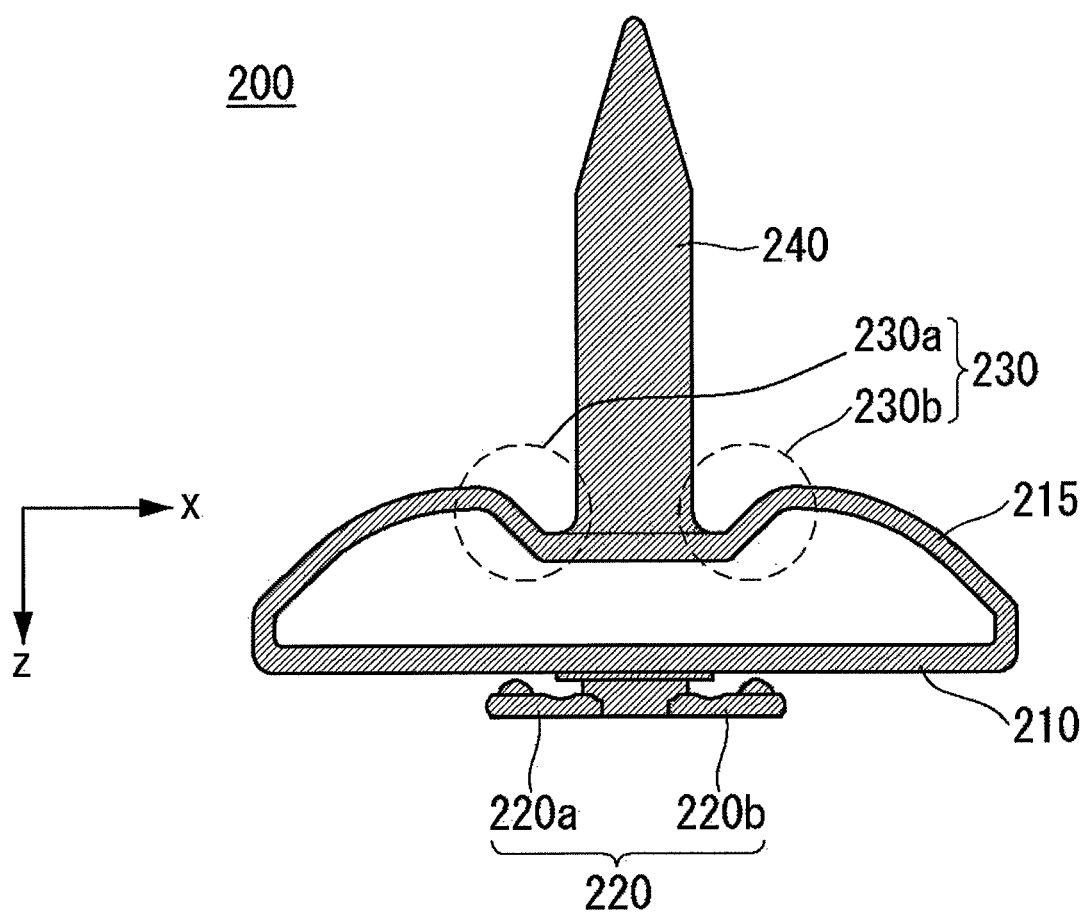
Figure 18:
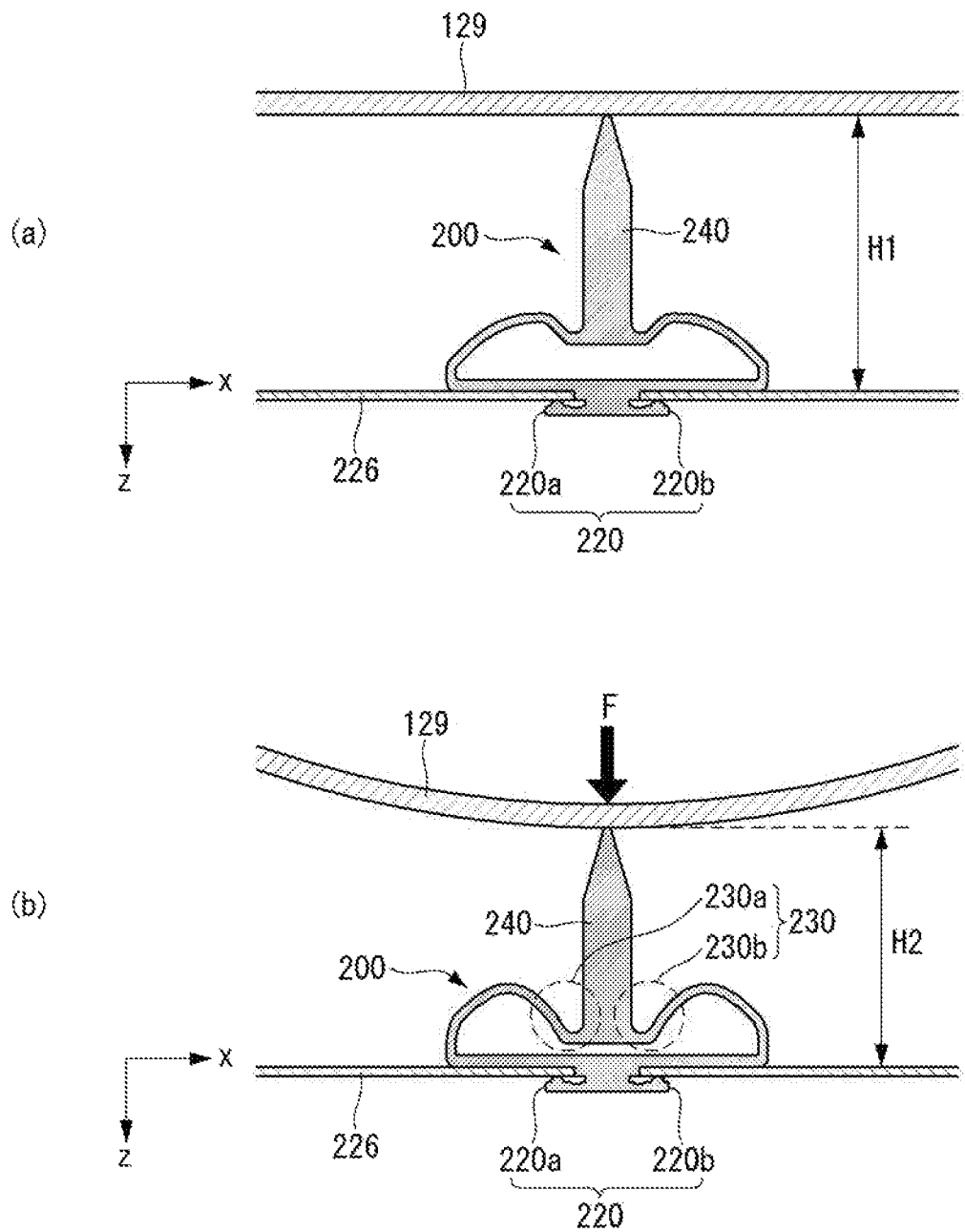

As illustrated in FIGS. 17 and 18, a supporter 200 according to another example embodiment of the invention may include a recessed elastic portion 230.

As illustrated in FIG. 17, first and second elastic portions 230a and 230b may be disposed on either side of the supporting portion 240. The first and second elastic portions 230a and 230b may be formed on a top portion 215 extending upward from the base end portion 210. The first and second elastic portions 230a and 230b may correspond to at least part of the top portion 215 that is depressed. As part of the first and second elastic portions 230a and 230b is depressed to a certain degree, the first and second elastic portions 230a and 230b may deform relatively faster on external force.

The thickness of the first and second elastic portions 230a and 230b may be smaller than the thickness of other parts of the top portion 215. In this case, the first and second elastic portions 230a and 230b may deform more easily.

As illustrated in (a) of FIG. 18, the supporter 200 may support the diffusion plate 129. This can keep the diffusion plate 129 from hanging down in the Z-axis direction.

As illustrated in (b) of FIG. 18, a force F may be applied to the diffusion plate 129 in the Z-axis direction. If the supporter 200 supports the diffusion plate 129 too rigidly against the Z-axial force F on the diffusion plate 129, the diffusion plate 129 and/or the supporter 200 may be damaged. The supporter 200 according to the example embodiment of the invention may prevent damage to the elastic portion 230 and/or the supporter 200 caused by the force F. For instance, the supporter 200 may have a first height H1 before application of a force F and have a second height H2 upon deformation. This change in height may be due to the deformation of the first and second elastic portions 230a and 230b.

The embodiments and/or the configurations of the invention may be combined with each other. For example, a configuration "A" described in one embodiment of the invention and the drawings and a configuration "B" described in another embodiment of the invention and the drawings may be combined with each other. Namely, although the combination between the configurations is not directly described, the combination is possible except in the instance where it is described that the combination is impossible. This is certain considering that the embodiment of the invention relates to the display device.

Any reference in this specification to "one embodiment," "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   an optical layer positioned behind the display panel;
   a reflecting sheet positioned at a rear side of the optical layer, the reflecting sheet having a plurality of holes;
   a frame configured to be positioned behind the reflecting sheet;
   a first substrate positioned between the reflecting sheet and the frame;
   a first row of light assemblies mounted on the first substrate and inserted into the plurality of holes;
   a second substrate positioned between the reflecting sheet and the frame;
   at least a second row of light assemblies mounted on the second substrate and inserted into the plurality of holes; and
   a supporter positioned between the optical layer and the reflecting sheet so that the optical layer and the reflecting sheet are spaced apart from each other,
   wherein the supporter is positioned parallel to the first and second rows of light assemblies and between the first and second rows of the light assemblies, and wherein the supporter comprises:
an elastic portion that at least partially deforms upon deformation of the optical layer, the elastic portion including a top portion and a bottom portion;
a first supporting portion in direct contact with the top portion of the elastic portion and extending in a direction of the optical layer so that a tip of the supporting portion comes into contact with the optical layer; and
a base portion on the reflecting sheet, connecting first and second ends of the bottom portion of the elastic portion and comprising a bottom part of the elastic portion, and
wherein a gap is formed between the elastic portion and the base portion.

2. The display device of claim 1, wherein the elastic portion has a trapezoid shape whose top, where the first supporting portion is positioned, is shorter in length than a bottom distance between the first and second ends of the bottom portion of the elastic portion.

3. The display device of claim 1, wherein a diameter of the tip of the first supporting portion coming into contact with the optical layer is smaller than a diameter of a base of the first supporting portion.

4. The display device of claim 1, wherein the elastic portion has a circle shape in a plane substantially perpendicular to the direction the first supporting portion extends.

5. The display device of claim 1, wherein the supporter further comprises at least one coupling projection on the base portion on an opposite side to the direction the first supporting portion projects and to be coupled to a coupling hole in the reflecting sheet.

6. The display device of claim 5, wherein the at least one coupling projection has a hook-shape with one side open.

7. The display device of claim 1, wherein the base portion includes at least one second supporting portion extending in the direction of the optical layer.

8. The display device of claim 7, wherein the at least one second supporting portion contacts the optical layer when the elastic portion is in contact with the optical layer deforms.

9. The display device of claim 7, wherein the at least one second supporting portion is positioned on at least one extension which is greater in width than the base portion.

10. The display device of claim 1, wherein the supporter does not contact a corresponding light assembly.

11. The display device of claim 1, wherein the supporter further comprises a single coupling projection on the base portion and to be coupled to a coupling hole in the reflecting sheet.

12. The display device of claim 11, wherein the single coupling projection projects in a direction opposite to the direction the first supporting portion projects.

13. The display device of claim 11, wherein when the coupling projection is coupled to the coupling hole in the reflection sheet, the coupling projection partially overlaps the reflection sheet.

14. The display device of claim 1, wherein the elastic portion further includes first and second recessed portions disposed on sides of the first supporting portion.

15. The display device of claim 14, wherein a thickness of the first and second recessed portions is smaller than a thickness of the top portion of the elastic portion.

16. The display device of claim 14, wherein the first and second recessed portions are formed on a front surface of the top portion.

17. The display device of claim 16, wherein the first and second recessed portions are recessed towards the reflecting sheet.

18. The display device of claim 14, wherein the top portion is positioned between the first and second recessed portions and the gap.

* * * * *